United States Patent [19]
Ikari

[11] Patent Number: 4,576,448
[45] Date of Patent: Mar. 18, 1986

[54] PHOTOGRAPHIC LENS SYSTEM FOR COMPACT CAMERAS

[75] Inventor: Kazuo Ikari, Tokyo, Japan
[73] Assignee: Olympus Optical Co., Ltd., Tokyo, Japan
[21] Appl. No.: 501,787
[22] Filed: Jun. 7, 1983
[30] Foreign Application Priority Data

Jun. 16, 1982 [JP] Japan ............... 57-102171
Oct. 28, 1982 [JP] Japan ............... 57-188181
Dec. 15, 1982 [JP] Japan ............... 57-218271

[51] Int. Cl.$^4$ .................... G02B 9/60; G02B 9/62
[52] U.S. Cl. ............................ 350/465; 350/455; 350/464
[58] Field of Search ............... 350/464, 465, 455

[56] References Cited

U.S. PATENT DOCUMENTS

| | | | |
|---|---|---|---|
| 4,394,073 | 7/1983 | Wakamiya | 350/465 |
| 4,429,958 | 2/1984 | Yamaguchi | 350/465 X |

FOREIGN PATENT DOCUMENTS

| | | | |
|---|---|---|---|
| 54-76148 | 6/1979 | Japan. | |
| 56-95207 | 8/1981 | Japan. | |
| 56-133711 | 10/1981 | Japan. | |
| 56-142515 | 11/1981 | Japan. | |
| 56-50248 | 11/1981 | Japan. | |
| 57-30814 | 2/1982 | Japan | 350/465 |
| 58-1117 | 1/1983 | Japan | 350/465 |

Primary Examiner—John K. Corbin
Assistant Examiner—Scott J. Sugarman
Attorney, Agent, or Firm—Cushman, Darby & Cushman

[57] ABSTRACT

A photographic lens system for compact cameras comprising a first, second, third, fourth and fifth lenses, the first lens being a positive meniscus lens arranged to be convex toward the object side, the second lens being a biconcave lens, the third lens being a positive lens, the fourth lens being a biconvex lens, the fifth lens being a negative meniscus lens arranged to be convex toward the image side, the photographic lens system being arranged to make aberrations, especially astigmatic difference and positive distortion, small by giving a large thickness to the fourth lens located on the image side by the stop and, at the same time, arranged to have a field angle of 70° or more.

21 Claims, 19 Drawing Figures

PHOTOGRAPHIC LENS SYSTEM FOR COMPACT CAMERAS

BACKGROUND OF THE INVENTION (a) Field of the Invention

The present invention relates to a photographic lens system for compact cameras with a field angle 70° or more and aperture ratio F/3.5.

(b) Description of the Prior Art

Tessar type lens systems and various other types of lens systems are known as photographic lens systems for compact cameras. However, the field angle of known photographic lens systems is about 60° to 65° at the largest.

Generally, for photographic lens systems, astigmatism and distortion come into problem when it is attempted to make the field angle large. Therefore, even when curvature of field is corrected by making Petzval's sum small, astigmatic difference increases. For photographic lens systems for compact cameras, a very high price is not desirable. Therefore, it is not preferable to correct astigmatic difference by adopting a complicated lens configuration. Even when it is permitted to make the lens configuration complicated, lenses should be arranged in a very limited space because the overall length of the lens system cannot be made long in case of lens systems for compact cameras and, cosequently, the lens configuration cannot be made complicated in practice. Therefore, for photographic lens systems for compact cameras, it is difficult to correct astigmatic difference.

In recent years, photographic lens systems of so-called telephoto type with comparatively simple lens configuration is known, i.e., such lens systems are arranged that the front lens group has positive power and rear lens group has negative power in order to make the overall length of the lens system short. For example, the lens system disclosed in Japanese published examined patent application No. 50248/81 is known as a lens system arranged as descrived in the above.

However, in case of the above-mentioned lens system, the front lens group has strong positive power and, therefore, positive distortion is caused by the front lens group. Besides, as a negative meniscus lens which is convex toward the image surface is arranged on the image side of the stop, opsitive distortion occurs largely at said negative meniscus lens when the field angle becomes larger and the incident angle of principal ray on said negative meniscus lens becomes larger. It is difficult to correct the above-mentioned positive distortion.

Besides, the lens system disclosed in Japanese published unexamined patent application No. 95207/81 is known as a wide-angle photographic lens system of telephoto type wherein the rear lens group consists of two lens components, i.e., a positive lens component and a negative lens component. However, the field angle of said lens system is about 60°.

When a compact camera is arranged that the stop serves also as the shutter, it is practically difficult to arrange the mechanism so as to move the stop. Therefore, lens systems for compact cameras are arranged that the stop is fixed and lens components are partially moved for the purpose of focusing. Especially, the focusing method to move the front lens or front lens group is adopted in most cases. As other known focusing methods, a method to move the intermediate lens is disclosed in Japanese published unexamined patent application No. 76148/79 and a method to move the rear lens is discolsed in Japanese published unexamined patent application No. 133711/81. However, in case of these focusing methods, it is impossible to perfectly correct variation of aberrations.

SUMMARY OF THE INVENTION

It is, therefore, a primary object of the present invention to provide a photographic lens system for compact cameras comprising a front lens group and a rear lens group and arranged to make astigmatic difference small and to correct positive distortion by arranging a thick convex lens in rear of the stop, the photographic lens system for compact cameras being arranged that the field angle is 70° or more, aperture ratio is F/3.5 and overall length of the lens system is short.

When the above-mentioned thick convex lens arranged in rear of the stop is regarded as two thin plano-convex lenses and a plane-parallel plate which are arranged integrally, study into the state of aberrations when a plane-parallel plate is arranged in rear of the stop enables to judge the state of aberrations of a lens system in which a thick convex lens is arranged in rear of the stop of the lens system.

Generally, when converging rays pass through a plane-parallel plate, positive curvature of field is caused and the value thereof is expressed by the following formulas:

$$\Delta m = \frac{d}{n}\left\{ 1 - \left(\frac{\cos i}{\cos i'}\right)^3 \right\}$$

$$\Delta s = \frac{d}{n}\left\{ 1 - \frac{\cos i}{\cos i'} \right\}$$

where, reference symbol d represents the thickness of the plane-parallel plate, reference symbol n represents the refractive index of the plane-parallel plate, reference symbol i represents the angle of incidence, and reference symbol i represents the angle of refraction.

As positive astigmatic difference is caused by the plane-parallel plate as described in the above, it is possible to reduce astigmatic difference by selecting the thickness of the plane-parallel plate as an adequate value.

Besides, distortion is caused by the above-mentioned plane-parallel plate and the value thereof is expressed by the following formula.

$$\Delta y' = \frac{d}{2}\left(\frac{n^2 - 1}{n^3}\right)\tan^3 i$$

As tan $i < 0$ in the formula shown in the above, it becomes $\Delta y' < 0$ and negative distortion occurs. Therefore, by the plane-parallel plate, it is possible to correct positive distortion caused by the front lens group with positive power and by the final lens.

Due to the above-mentioned reason, it is possible to correct astigmatic difference and distortion by arranging a thick lens in rear of the stop and selecting the thickness thereof as an adequate value.

Due to the reason described so far, the photographic lens system for compact cameras according to the present invention is arranted as a lens system with five-component five-element lens configuration comprising a first, second, third, fourth and fifth lenses, the first lens being a positive meniscus lens arranged to be convex toward the object side, the second lens being a biconcave lens, the third lens being a positive lens, the fourth lens being a biconvex lens, the fifth lens being a negative meniscus lens arranged to be convex toward the image side, the photographic lens system according to the present invention being further arranged that the value of the thickness $d_7$ of the fourth lens located just in rear of the stop is selected in the range defined by the condition (1) shown below so that astigmatic difference and distortion are corrected favourably:

$$0.15f < d_7 < 0.4f \tag{1}$$

where, reference symbol f represents the focal length of the lens system as a whole.

If $d_7$ becomes smaller than the lower limit of the condition (1), the correcting action of the convex lens (the fourth lens) becomes weak and it is impossible to correct astigmatic difference and positive distortion. If $d_7$ becomes larger than the upper limit of the condition (1), the lens system becomes large and it is not suitable as a lens system for compact cameras.

The photographic lens system having the lens configuration described in the above and arranged to fulfill the condition (1) enables to attain the object of the present invention. When, however, it is arranted to further fulfill the conditions (2) and (3) shown below, it is possible to obtain a more favourable photographic lens system.

$$1.7 < n_2 \tag{2}$$

$$0.35f < |f_5| < 0.6f, f_5 < 0 \tag{3}$$

where, reference symbol $n_2$ represents the refractive index of the second lens, and reference symbol $f_5$ represents the focal length of the fifth lens.

To reduce curvature of field, Petzval's sum should be made small. If, however, Petzval's sum is made too small, astigmatic difference increases in the portion of intermediate field angle when astigmatic difference near the portion of the largest field angle is corrected favourably at the time of correction of astigmatic difference by means of the fourth lens. To select Petzval's sum as an adequate value by taking the above-mentioned point into consideration, it is preferable to select the refractive index $n_2$ of the second lens so as to fulfill the condition (2). If $n_2$ becomes smaller than the lower limit of the condition (2), Petzval's sum becomes too small and it is impossible to correct astigmatic difference in the portion of intermediate field angle.

To obtain a lens system with more favourable performance by limiting positive distortion to be caused, it is preferable to select the focal length $f_5$ of the fifth lens so as to fulfill the condition (3) shown in the above. If $|f_5|$ becomes smaller than the lower limit of the condition (3), positive distortion increases. If $|f_5|$ becomes larger than the upper limit of the condition (3), the overall length of the lens system becomes long and it is not suitable for a lens system for compact cameras.

When the power of the fifth lens is defined to fulfill the condition (3) as described in the above, spherical aberration will curve largely when the absolute value $|r_9|$ of the radius of curvature of the sirface on the object side of the fifth lens becomes small. Besides, when $|r_9|$ becomes very large, the radius of curvature of the surface on the image side of the fifth lens also becomes large because the focal length $f_5$ of the fifth lens is defined to a certain range shown in the above. As a result, the surface on the image side of the fifth lens becomes nearly vertical to rays. In consequence, distortion increases and it becomes impossible to correct it. Therefore, it is preferable to select $|r_9|$ so as to fulfill the condition (4) shown below.

$$0.25f < |r_9| < 0.35f \tag{4}$$

If $|r_9|$ becomes smaller than the lower limit of the condition (4), it is impossible to correct the curve of spherical aberration. If $|r_9|$ becomes larger than the upper limit of the condition (4), it is impossible to correct positive distortion.

When $r_9$ is defined as desctibed in the above, it is preferable to select the radius of curvature $r_8$ of the surface on the image side of the fourth lens in the range defined by the condition (5) shown below in order to make the lens system more compact.

$$0.4f < |r_8| < 0.5f, r_8 < 0 \tag{5}$$

If $|r_8|$ becomes smaller than the lower limit of the condition (5), spherical aberration will be undercorrected. If $|r_8|$ becomes larger than the upper limit of the condition (5), the airspace between the fourth and fifth lenses should be made large in order to ensure sufficient intensity of light in the marginal portion. As a result, the overall length of the lens system increases, and this is not desirable.

Figure 1:
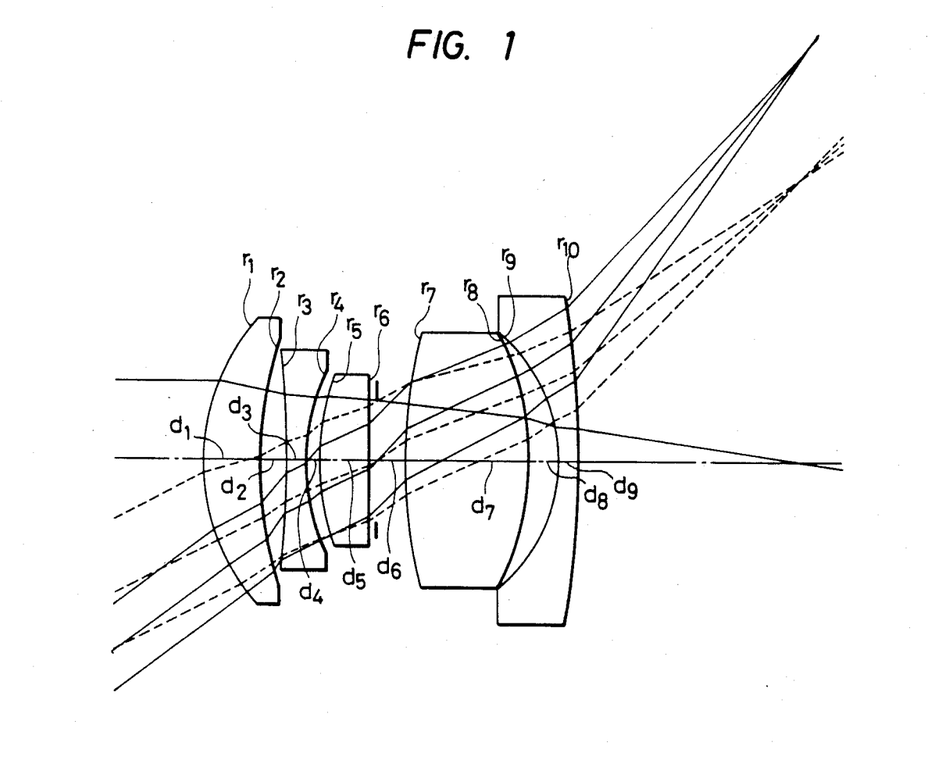
FIG. 1 shows a sectional view of the photographic lens system for compact cameras according to the present invention.

To make the field angle wide and, at the same time, to make the overall length of the lens system short in case of the lens system with the lens configuration as shown in FIG. 1, it is preferable to arrange that the power of the front lens group (the first, second and third lenses) and power of the lens (the fifth lens) arranged on the image side in the rear lens group are made strong. When, however, the power of the front lens group is made strong, curvature of field increases, and it is impossible to obtain favourable quality of image to the marginal portion. When this point is taken into consideration, more preferable way is to make the power of the front lens group weak by balancing the power of the front lens group with the power of the positive lens (the fourth lens) in the rear lens group. Thereofre, it is preferable to arrange so that the focal length $f_{123}$ of the front lens group and focal length $f_4$ of the fourth lens fulfill the following condition.

$$2.0 < f_{123}/f_4 < 4.0$$

If $f_{123}/f_4$ becomes smaller than the lower limit of the condition shown in the above, the power of the front lens group becomes strong and curvature of field increases. If $f_{123}/f_4$ becomes larger than the upper limit of the condition shown in the above, the overall length of the lens system becomes long, and this conflicts with one of the objects of the present invention, i.e., to make the lens system compact.

Now, the focusing method of the photographic lens system according to the present invention is described below. Generally, the following methods are considered as the focusing methods: (1) the method to advance the lens system as a whole, (2) the method to advance the front lens group, (3) the method to advance the first lens, (4) the method to move the fourth lens, i.e., the intermediate lens, toward the image side, and (5) the method to move the fifth lens i.e., the rear lens group, toward the image side. Besides, combinations of the focusing methods (1) to (5) may be also considered.

Out of the above-mentioned methods, the methods to move partial lens components in the lens system necessarily cause variation of aberrations at the time of focusing. For example, when the lens system is focused by the method (3) to advance the front lens, spherical aberration becomes negative and curvature of field becomes positive when the lens system is focused on an object at a short distance. In case of the focusing method to move the rear lens (method (5)), i.e., the method to move the negative lens arranged on the image side of the stop like the know focusing method disclosed in Japanese published unexamined patent application No. 133711/81 mentioned before, spherical aberration becomes negative and curvature of field also becomes negative when the lens system is focused of an object at a short distance.

As the correlation between spherical aberration and curvature of field, it is desirable that the image surface comes to a position close to the optical image position determined by spherical aberration. In case of focusing methods to move partial lenses in the lens system, it is impossible to bring the image surface close to the optical image position determined by spherical aberration. Even in cace that the direction of variation of spherical aberration becomes the same as the direction of variation of curvature of field at the time of focusing as in case of the focusing method to move the rear lens, when the amount of variation of spherical aberration and amount of variation of curvature of field become different from each other, the marginal portion of the image surface does not always come to the optical image position determined by spherical aberration because of curvature of field.

In case of the lens system according to the present invention, a lens component to be moved for the purpose of focusing is provided in each of the front lens group on the object side of the stop and the rear lens group on the image side of the stop, and it is so arranged that the signs of refractive powers of the above-mentioned movable lens components become different from each other. It is thereby arranged that the variation of curvature of field, which largely vary when the movable lens components are moved, becomes a small and adequate value as a whole and, moreover, the direction of variation of curvature of field becomes the same as the direction of variation of spherical aberration to be caused by the movement of the movable lens components. Thus, the lens system according to the present invention is arranged that the amount of variation of curvature of field becomes equal to the amount of shifting of the optical image position determined by spherical aberration, said optical image position being shifted by variation of spherical aberration, and is thereby arranged that a favourable image is obtained up to the short distance. In this case, it is preferable to arrange that both of the movable lens components have surfaces which are concentric in respect to the stop and, especially, it is preferable to arrange that those movable lens components have meniscus shapes.

DETAILED DESCRIPTION OF THE PREFERRED EMBODIMENTS

Now, preferred embodiments of the photographic lens system for compact cameras according to the present invention described so far are shown below.

| Embodiment 1 | | |
|---|---|---|
| $r_1 = 36.9278$ | | |
| $d_1 = 10.6219$ | $n_1 = 1.88300$ | $\nu_1 = 40.76$ |
| $r_2 = 71.8243$ | | |
| $d_2 = 4.9584$ | | |
| $r_3 = -251.7459$ | | |
| $d_3 = 3.4445$ | $n_2 = 1.80518$ | $\nu_2 = 25.43$ |
| $r_4 = 35.6209$ | | |
| $d_4 = 2.5517$ | | |
| $r_5 = 42.5414$ | | |
| $d_5 = 9.3616$ | $n_3 = 1.72000$ | $\nu_3 = 41.98$ |
| $r_6 = -1096.6423$ | | |
| $d_6 = 6.9452$ | | |
| $r_7 = 95.5924$ | | |
| $d_7 = 22.8878$ | $n_4 = 1.59270$ | $\nu_4 = 35.29$ |
| $r_8 = -51.5733$ | | |
| $d_8 = 6.3414$ | | |
| $r_9 = -29.3375$ | | |
| $d_9 = 3.4448$ | $n_5 = 1.62606$ | $\nu_5 = 39.21$ |
| $r_{10} = -177.0669$ | | |
| $f = 100, |f_5|/f = 0.557, f_{123}/f_4 = 2.35$ | | |
| Embodiment 2 | | |
| $r_1 = 37.2084$ | | |
| $d_1 = 10.6181$ | $n_1 = 1.88300$ | $\nu_1 = 40.76$ |
| $r_2 = 69.9787$ | | |
| $d_2 = 4.9411$ | | |
| $r_3 = -221.5758$ | | |
| $d_3 = 3.4433$ | $n_2 = 1.76182$ | $\nu_2 = 26.55$ |
| $r_4 = 35.9272$ | | |
| $d_4 = 2.5508$ | | |
| $r_5 = 42.3315$ | | |
| $d_5 = 9.3582$ | $n_3 = 1.71700$ | $\nu_3 = 47.94$ |
| $r_6 = -2207.6200$ | | |
| $d_6 = 6.9057$ | | |
| $r_7 = 92.4645$ | | |
| $d_7 = 23.1448$ | $n_4 = 1.59270$ | $\nu_4 = 35.29$ |
| $r_8 = -51.0854$ | | |
| $d_8 = 5.9603$ | | |
| $r_9 = -29.4121$ | | |
| $d_9 = 3.6069$ | $n_5 = 1.66998$ | $\nu_5 = 39.32$ |
| $r_{10} = -154.9387$ | | |
| $f = 100, |f_5|/f = 0.548, f_{123}/f_4 = 2.34$ | | |

-continued

Embodiment 3

| | | |
|---|---|---|
| $r_1 = 37.7611$ | | |
| $d_1 = 11.6679$ | $n_1 = 1.88300$ | $\nu_1 = 40.76$ |
| $r_2 = 73.0205$ | | |
| $d_2 = 4.6672$ | | |
| $r_3 = -244.9971$ | | |
| $d_3 = 3.4483$ | $n_2 = 1.80518$ | $\nu_2 = 25.43$ |
| $r_4 = 37.4424$ | | |
| $d_4 = 2.5545$ | | |
| $r_5 = 44.3299$ | | |
| $d_5 = 9.3717$ | $n_3 = 1.72000$ | $\nu_3 = 41.98$ |
| $r_6 = -656.8615$ | | |
| $d_6 = 7.6324$ | | |
| $r_7 = 99.1495$ | | |
| $d_7 = 20.3054$ | $n_4 = 1.59739$ | $\nu_4 = 34.48$ |
| $r_8 = -46.7657$ | | |
| $d_8 = 5.4097$ | | |
| $r_9 = -29.4558$ | | |
| $d_9 = 7.5910$ | $n_5 = 1.62831$ | $\nu_5 = 37.95$ |
| $r_{10} = -282.7250$ | | |

$f = 100$, $|f_5|/f = 0.529$, $f_{123}/f_4 = 2.39$

Embodiment 4

| | | |
|---|---|---|
| $r_1 = 37.1666$ | | |
| $d_1 = 11.6679$ | $n_1 = 1.88300$ | $\nu_1 = 40.76$ |
| $r_2 = 70.7724$ | | |
| $d_2 = 4.6672$ | | |
| $r_3 = -314.4423$ | | |
| $d_3 = 3.4483$ | $n_2 = 1.80518$ | $\nu_2 = 25.43$ |
| $r_4 = 36.3377$ | | |
| $d_4 = 2.5545$ | | |
| $r_5 = 43.7507$ | | |
| $d_5 = 9.3717$ | $n_3 = 1.72000$ | $\nu_3 = 41.98$ |
| $r_6 = -732.0967$ | | |
| $d_6 = 7.6324$ | | |
| $r_7 = 101.5236$ | | |
| $d_7 = 22.7588$ | $n_4 = 1.59270$ | $\nu_4 = 35.29$ |
| $r_8 = -51.8227$ | | |
| $d_8 = 5.4097$ | | |
| $r_9 = -30.4738$ | | |
| $d_9 = 6.8967$ | $n_5 = 1.62606$ | $\nu_5 = 39.21$ |
| $r_{10} = -225.3586$ | | |

$f = 100$, $|f_5|/f = 0.571$, $f_{123}/f_4 = 2.12$

Embodiment 5

| | | |
|---|---|---|
| $r_1 = 38.0501$ | | |
| $d_1 = 11.6679$ | $n_1 = 1.88300$ | $\nu_1 = 40.76$ |
| $r_2 = 70.2468$ | | |
| $d_2 = 4.6672$ | | |
| $r_3 = -215.0498$ | | |
| $d_3 = 3.4483$ | $n_2 = 1.80518$ | $\nu_2 = 25.43$ |
| $r_4 = 41.1290$ | | |
| $d_4 = 2.5545$ | | |
| $r_5 = 44.6558$ | | |
| $d_5 = 9.3717$ | $n_3 = 1.72000$ | $\nu_3 = 43.70$ |
| $r_6 = -1355.6606$ | | |
| $d_6 = 5.8781$ | | |
| $r_7 = 92.5723$ | | |
| $d_7 = 22.5159$ | $n_4 = 1.59270$ | $\nu_4 = 35.29$ |
| $r_8 = -50.0412$ | | |
| $d_8 = 5.4097$ | | |
| $r_9 = -28.1250$ | | |
| $d_9 = 6.9005$ | $n_5 = 1.62606$ | $\nu_5 = 39.21$ |
| $r_{10} = -172.7446$ | | |

$f = 100$, $|f_5|/f = 0.547$, $f_{123}/f_4 = 2.32$

Embodiment 6

| | | |
|---|---|---|
| $r_1 = 37.5812$ | | |
| $d_1 = 11.6238$ | $n_1 = 1.88300$ | $\nu_1 = 40.76$ |
| $r_2 = 72.9450$ | | |
| $d_2 = 4.6496$ | | |
| $r_3 = -228.4699$ | | |
| $d_3 = 3.4352$ | $n_2 = 1.80518$ | $\nu_2 = 25.43$ |
| $r_4 = 36.4531$ | | |
| $d_4 = 2.5448$ | | |
| $r_5 = 42.1673$ | | |
| $d_5 = 9.3363$ | $n_3 = 1.72000$ | $\nu_3 = 41.98$ |
| $r_6 = -816.9711$ | | |
| $d_6 = 7.6036$ | | |
| $r_7 = 96.4188$ | | |
| $d_7 = 20.2247$ | $n_4 = 1.63980$ | $\nu_4 = 34.48$ |
| $r_8 = -47.0295$ | | |
| $d_8 = 5.3892$ | | |

-continued

| | | |
|---|---|---|
| $r_9 = -29.4885$ | | |
| $d_9 = 7.5593$ | $n_5 = 1.72342$ | $\nu_5 = 37.95$ |
| $r_{10} = -215.6929$ | | |

$f = 100$, $|f_5|/f = 0.480$, $f_{123}/f_4 = 2.58$

Embodiment 7

| | | |
|---|---|---|
| $r_1 = 37.2670$ | | |
| $d_1 = 10.6334$ | $n_1 = 1.84100$ | $\nu_1 = 43.23$ |
| $r_2 = 71.1567$ | | |
| $d_2 = 4.9483$ | | |
| $r_3 = -211.9667$ | | |
| $d_3 = 3.4483$ | $n_2 = 1.71736$ | $\nu_2 = 29.51$ |
| $r_4 = 35.1359$ | | |
| $d_4 = 2.5545$ | | |
| $r_5 = 42.5678$ | | |
| $d_5 = 9.3717$ | $n_3 = 1.71700$ | $\nu_3 = 47.94$ |
| $r_6 = -5122.0812$ | | |
| $d_6 = 6.9156$ | | |
| $r_7 = 103.8046$ | | |
| $d_7 = 23.1784$ | $n_4 = 1.59880$ | $\nu_4 = 40.00$ |
| $r_8 = -49.0515$ | | |
| $d_8 = 5.9690$ | | |
| $r_9 = -29.9591$ | | |
| $d_9 = 3.6149$ | $n_5 = 1.66390$ | $\nu_5 = 39.32$ |
| $r_{10} = -152.3278$ | | |

$f = 100$, $|f_5|/f = 0.568$, $f_{123}/f_4 = 2.37$

Embodiment 8

| | | |
|---|---|---|
| $r_1 = 34.8858$ | | |
| $d_1 = 11.6672$ | $n_1 = 1.86995$ | $\nu_1 = 40.69$ |
| $r_2 = 69.5101$ | | |
| $d_2 = 4.6669$ | | |
| $r_3 = -382.0239$ | | |
| $d_3 = 2.9028$ | $n_2 = 1.85563$ | $\nu_2 = 23.66$ |
| $r_4 = 29.4132$ | | |
| $d_4 = 2.5545$ | | |
| $r_5 = 33.1008$ | | |
| $d_5 = 9.9161$ | $n_3 = 1.72047$ | $\nu_3 = 34.72$ |
| $r_6 = 1433.9817$ | | |
| $d_6 = 7.8050$ | | |
| $r_7 = 80.0037$ | | |
| $d_7 = 19.3608$ | $n_4 = 1.66446$ | $\nu_4 = 35.71$ |
| $r_8 = -43.0020$ | | |
| $d_8 = 4.7013$ | | |
| $r_9 = -27.2916$ | | |
| $d_9 = 6.0628$ | $n_5 = 1.83400$ | $\nu_5 = 37.16$ |
| $r_{10} = -160.8388$ | | |

$f = 100$, $|f_5|/f = 0.402$, $f_{123}/f_4 = 3.03$

Embodiment 9

| | | |
|---|---|---|
| $r_1 = 35.7111$ | | |
| $d_1 = 11.7178$ | $n_1 = 1.87588$ | $\nu_1 = 43.49$ |
| $r_2 = 71.7423$ | | |
| $d_2 = 4.6871$ | | |
| $r_3 = -380.6859$ | | |
| $d_3 = 2.9154$ | $n_2 = 1.82506$ | $\nu_2 = 24.96$ |
| $r_4 = 29.4108$ | | |
| $d_4 = 2.5655$ | | |
| $r_5 = 33.6628$ | | |
| $d_5 = 9.9591$ | $n_3 = 1.72047$ | $\nu_3 = 34.72$ |
| $r_6 = 624.1191$ | | |
| $d_6 = 7.839$ | | |
| $r_7 = 80.3506$ | | |
| $d_7 = 19.4396$ | $n_4 = 1.66446$ | $\nu_4 = 35.71$ |
| $r_8 = -43.1884$ | | |
| $d_8 = 4.7217$ | | |
| $r_9 = -27.6775$ | | |
| $d_9 = 6.0858$ | $n_5 = 1.83400$ | $\nu_5 = 37.16$ |
| $r_{10} = -156.5912$ | | |

$f = 100$, $|f_5|/f = 0.412$, $f_{123}/f_4 = 3.13$

Embodiment 10

| | | |
|---|---|---|
| $r_1 = 34.9347$ | | |
| $d_1 = 11.6667$ | $n_1 = 1.88300$ | $\nu_1 = 40.76$ |
| $r_2 = 67.6624$ | | |
| $d_2 = 4.6667$ | | |
| $r_3 = -420.7331$ | | |
| $d_3 = 2.9026$ | $n_2 = 1.84666$ | $\nu_2 = 23.88$ |
| $r_4 = 29.4509$ | | |
| $d_4 = 2.5543$ | | |
| $r_5 = 33.5803$ | | |
| $d_5 = 9.9157$ | $n_3 = 1.72047$ | $\nu_3 = 34.72$ |
| $r_6 = 840.1923$ | | |

-continued $d_6 = 7.8048$
$r_7 = 80.0000$
$d_7 = 19.3540$    $n_4 = 1.66446$    $\nu_4 = 35.71$
$r_8 = -43.0000$
$d_8 = 4.7015$
$r_9 = -27.8644$
$d_9 = 6.0581$    $n_5 = 1.83400$    $\nu_5 = 37.16$
$r_{10} = -164.9675$
$f = 100, |f_5|/f = 0.410, f_{123}/f_4 = 3.16$ Embodiment 11

$r_1 = 37.2931$
$d_1 = 11.6694$    $n_1 = 1.88300$    $\nu_1 = 40.76$
$r_2 = 73.2932$
$d_2 = 4.8627$
$r_3 = -161.2470$
$d_3 = 3.4488$    $n_2 = 1.84666$    $\nu_2 = 23.88$
$r_4 = 36.8066$
$d_4 = 2.5549$
$r_5 = 42.2447$
$d_5 = 9.3730$    $n_3 = 1.72047$    $\nu_3 = 34.72$
$r_6 = -216.8284$
$d_6 = 7.6333$
$r_7 = 88.4469$
$d_7 = 20.3040$    $n_4 = 1.66446$    $\nu_4 = 35.71$
$r_8 = -47.4593$
$d_8 = 5.3801$
$r_9 = -29.5908$
$d_9 = 7.5891$    $n_5 = 1.83400$    $\nu_5 = 37.16$
$r_{10} = -193.4414$
$f = 100, |f_5|/f = 0.422, f_{123}/f_4 = 2.66$

Embodiment 12

$r_1 = 34.5897$
$d_1 = 11.6678$    $n_1 = 1.88300$    $\nu_1 = 40.76$
$r_2 = 68.2036$
$d_2 = 4.6671$
$r_3 = -469.2025$
$d_3 = 2.9029$    $n_2 = 1.84666$    $\nu_2 = 23.88$
$r_4 = 30.4475$
$d_4 = 2.5546$
$r_5 = 36.6517$
$d_5 = 9.9167$    $n_3 = 1.72047$    $\nu_3 = 34.72$
$r_6 = 1481.2730$
$d_6 = 7.842$
$r_7 = 86.3452$
$d_7 = 19.2011$    $n_4 = 1.66446$    $\nu_4 = 35.71$
$r_8 = -45.2419$
$d_8 = 5.0184$
$r_9 = -29.6013$
$d_9 = 6.1629$    $n_5 = 1.83400$    $\nu_5 = 37.16$
$r_{10} = -167.4479$
$f = 100, |f_5|/f = 0.440, f_{123}f_4 = 2.96$

Embodiment 13

$r_1 = 37.0605$
$d_1 = 11.6678$    $n_1 = 1.88300$    $\nu_1 = 40.76$
$r_2 = 71.5043$
$d_2 = 4.6672$
$r_3 = -170.9580$
$d_3 = 3.4483$    $n_2 = 1.84666$    $\nu_2 = 23.88$
$r_4 = 36.9683$
$d_4 = 2.5546$
$r_5 = 42.4542$
$d_5 = 9.3717$    $n_3 = 1.72047$    $\nu_3 = 34.72$
$r_6 = -232.2169$
$d_6 = 7.6323$
$r_7 = 89.3367$
$d_7 = 20.3012$    $n_4 = 1.66446$    $\nu_4 = 35.71$
$r_8 = -46.6954$
$d_8 = 5.4097$
$r_9 = -29.6999$
$d_9 = 7.5880$    $n_5 = 1.83400$    $\nu_5 = 37.16$
$r_{10} = -199.0312$
$f = 100, |f_5|/f = 0.427, f_{123}/f_4 = 2.70$

In embodiments shown in the above, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1, n_2, n_3, n_4$ and $n_5$ respectively represent refractive indices of respective lenses, and reference symbols $\nu_1, \nu_2 \nu_3, \nu_4$ and $\nu_5$ respectively represent Abbe's numbers of respective lenses.

As it is evident from the explanation given so far and respective embodiments, the present invention provides a photographic lens system arranged compactly which comprises a front lens group located on the object side and a rear lens group located on the image side and, at the same time, which is arranged to have a wide field angle and favourably corrected aberrations such as astigmatic difference, distortion, etc. by providing a thick convex lens in rear of the stop.

Figure 15:
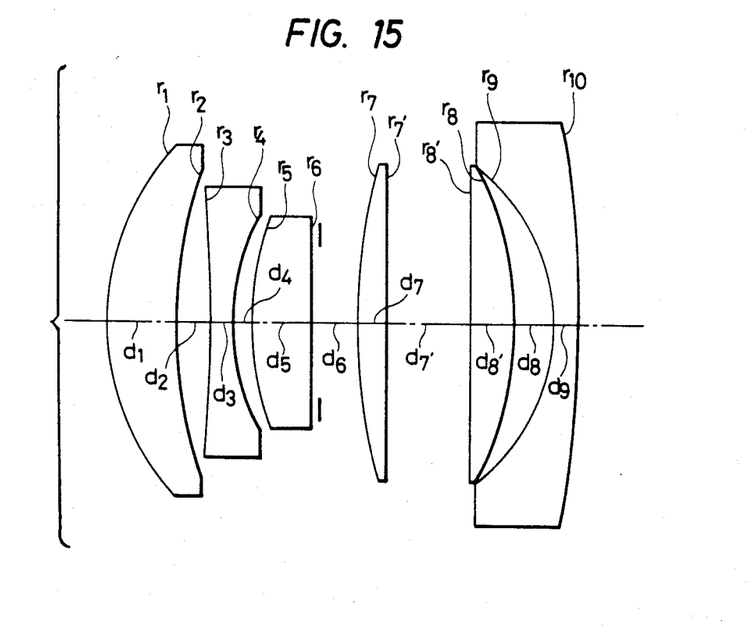
FIG. 15 shows a sectional view of a lens system arranged by replacing the fourth lens in the lens system according to Embodiment 1 with two lenses which are located by leaving an airspace between them.
Figure 16:
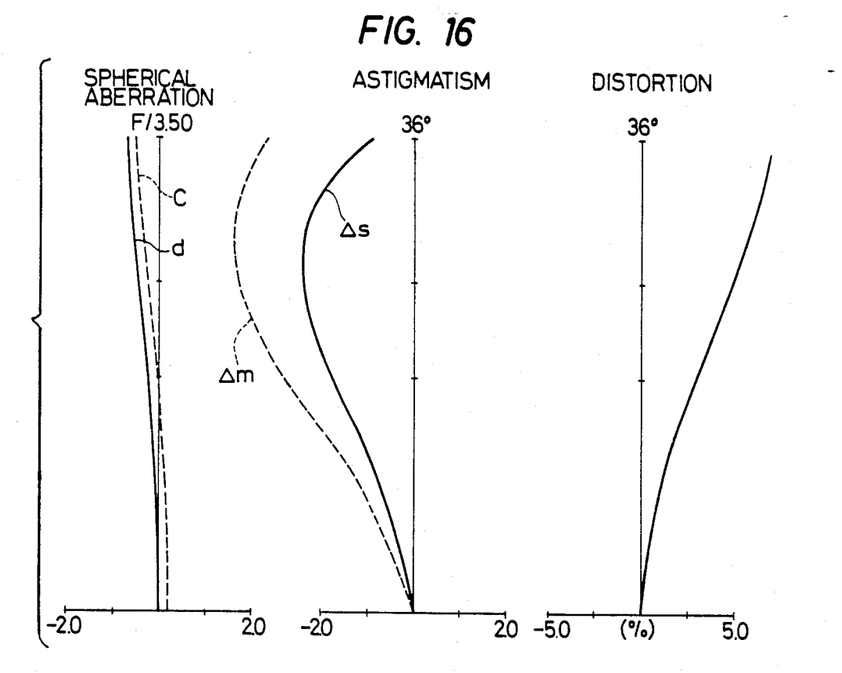
FIG. 16 shows graphs illustrating aberration curves of the lens system shown in FIG. 15.

When the lens system according to Embodiment 1 is rearranged to have the lens configuration as shown in FIG. 15, i.e., when the portion corresponding to the plane-parallel plate in the thick lens is replaced with an airspace, numerical data of that lens system become as shown below and aberration curves of said lens system become as shown in FIG. 16.

Figure 2:
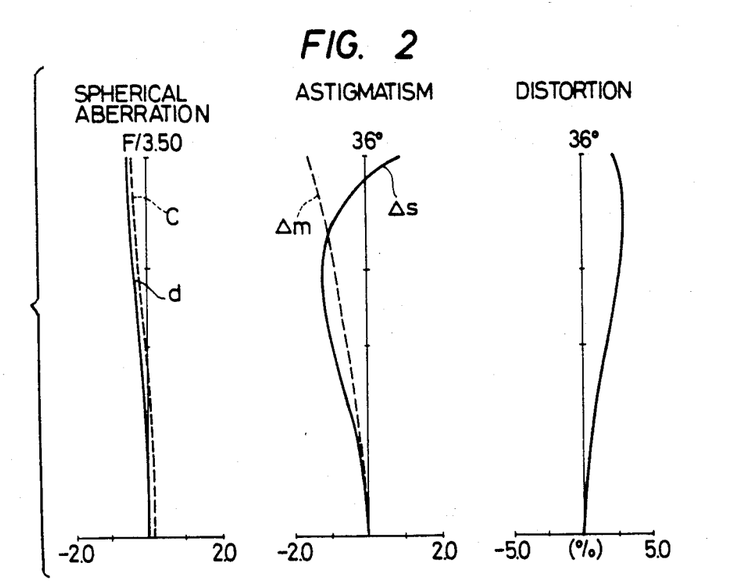
FIGS. 2 through 14 respectively show graphs illustrating aberration curves of Embodiments 1 through 13 of the photographic lens system according to the present invention.
Figure 3:
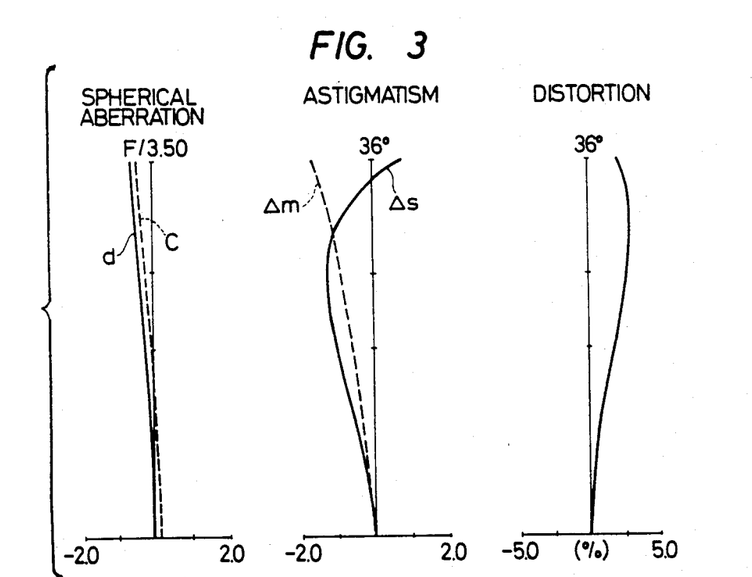
Figure 4:
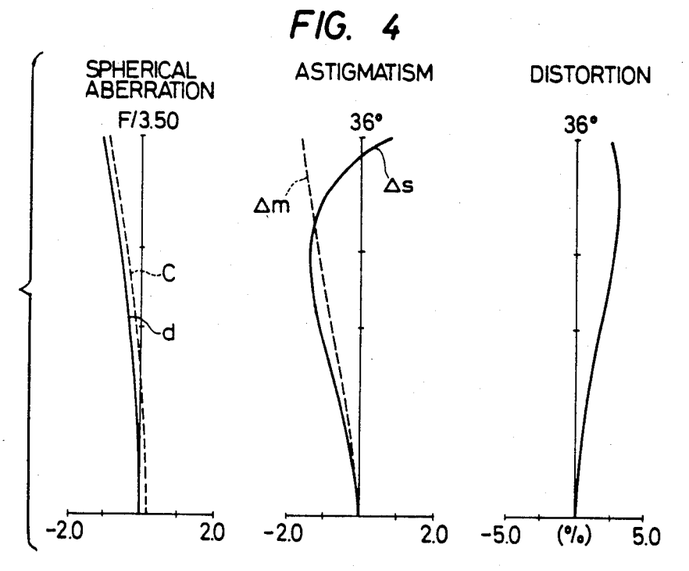
Figure 5:
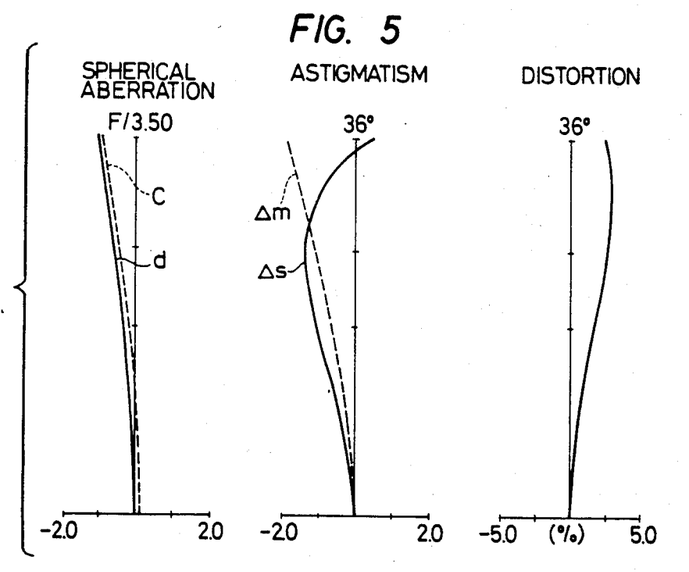
Figure 6:
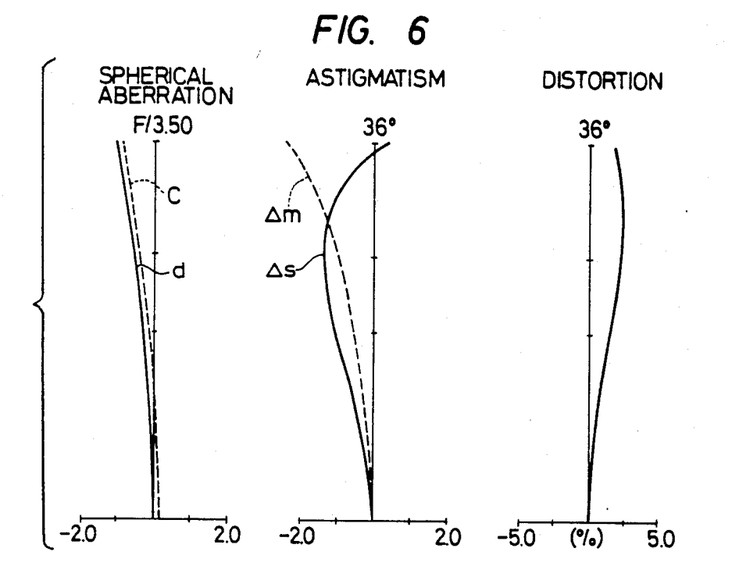
Figure 7:
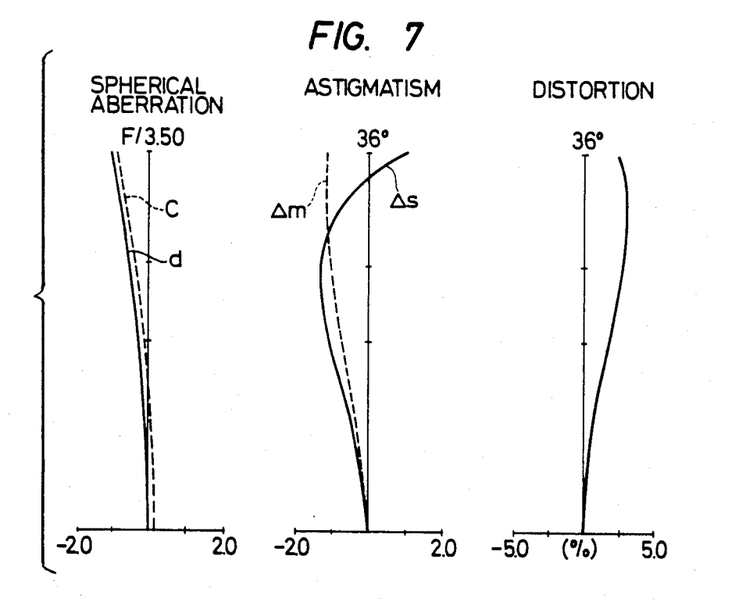
Figure 8:
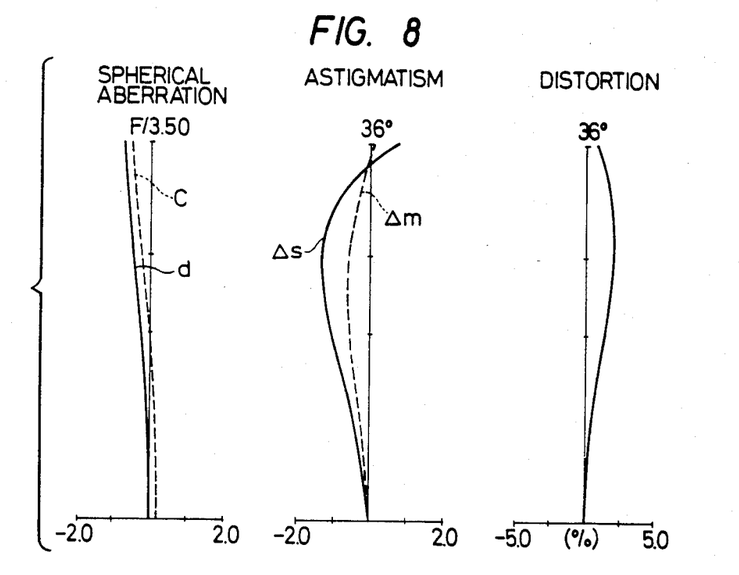
Figure 9:
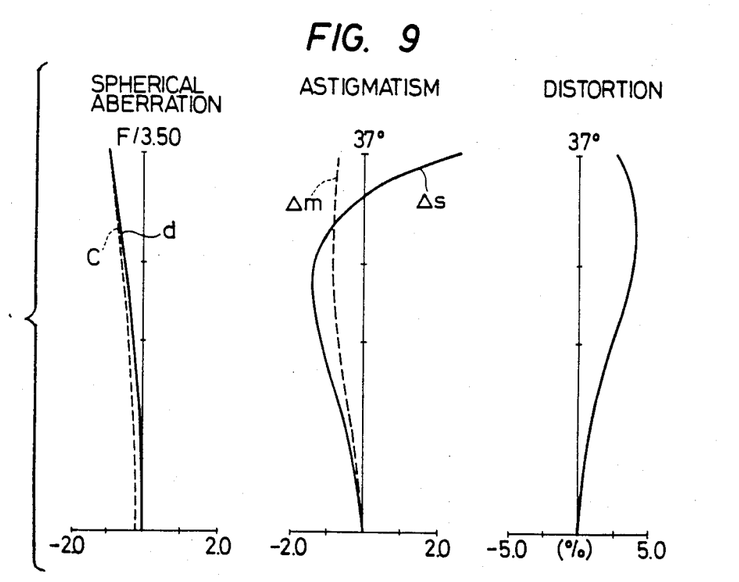
Figure 10:
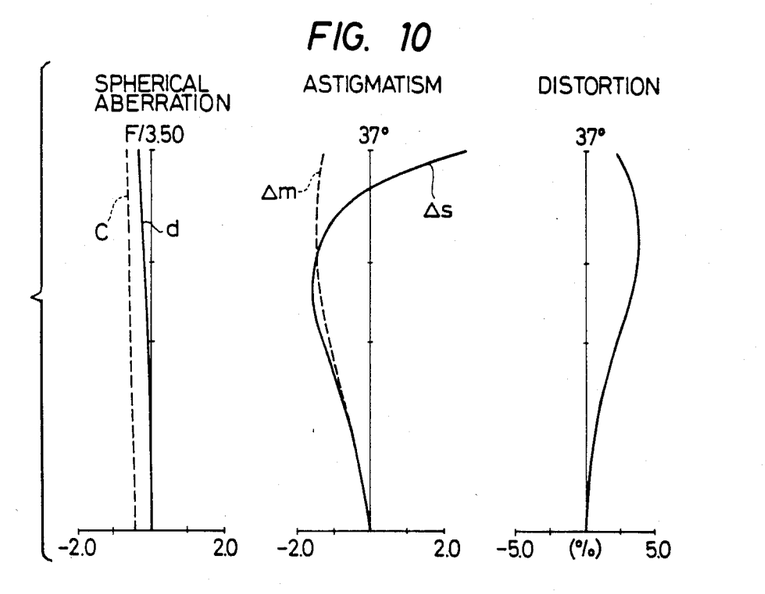
Figure 11:
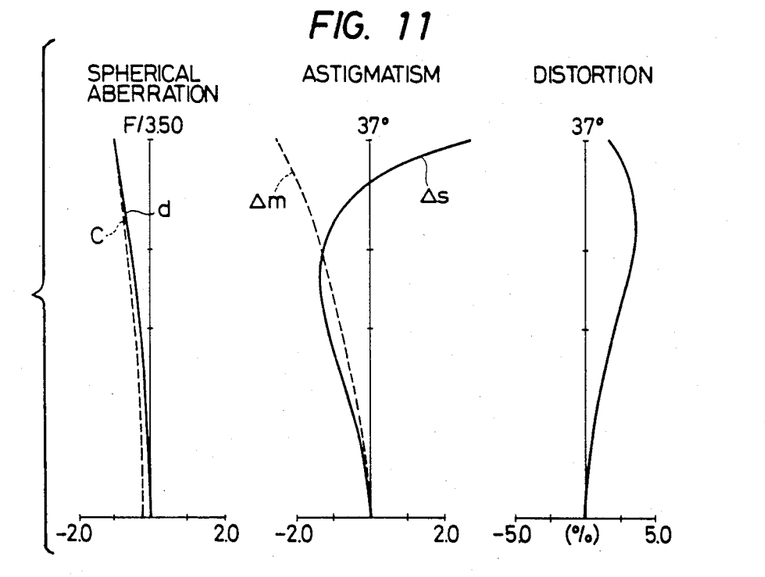
Figure 12:
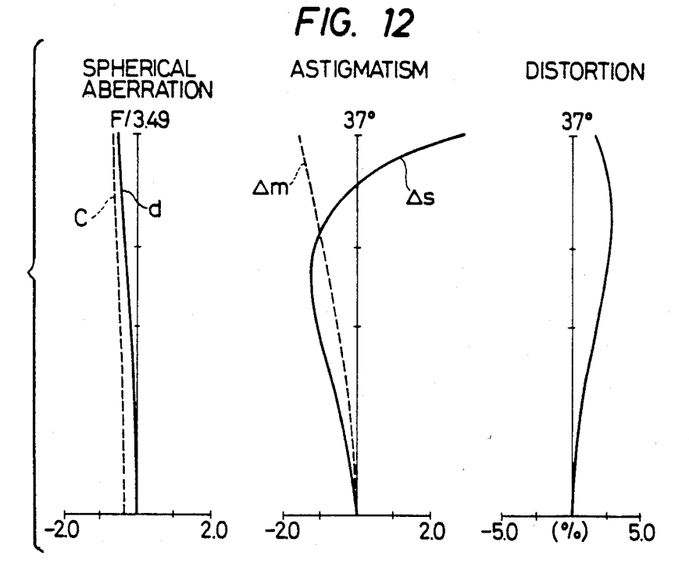
Figure 13:
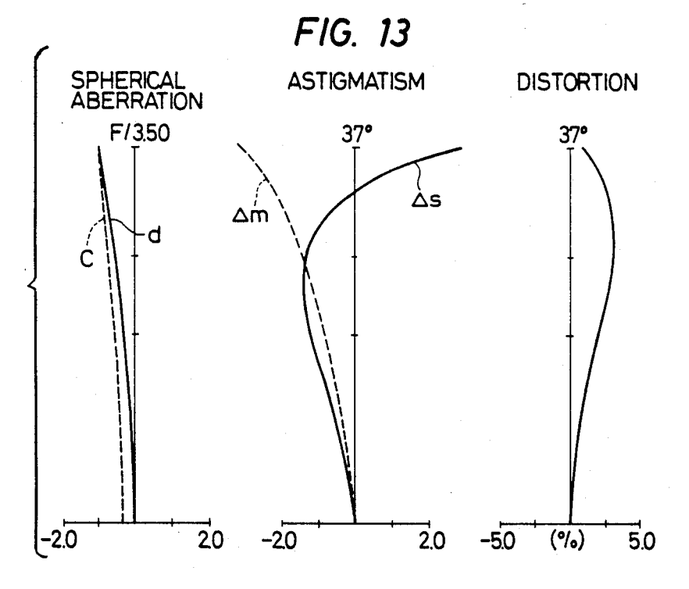
Figure 14:
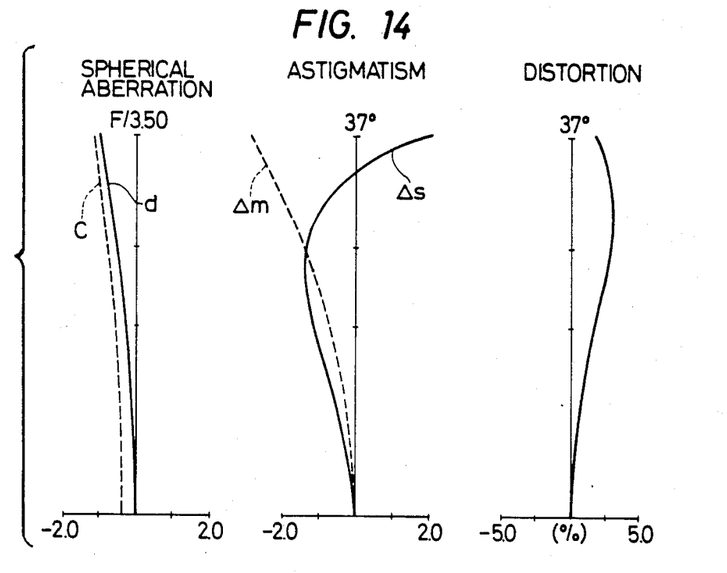

$r_1 = 36.9278$
$d_1 = 10.6219$    $n_1 = 1.88300$    $\nu_1 = 40.76$
$r_2 = 71.8243$
$d_2 = 4.9584$
$r_3 = -251.7459$
$d_3 = 3.4445$    $n_2 = 1.80518$    $\nu_2 = 25.43$
$r_4 = 35.6209$
$d_4 = 2.5517$
$r_5 = 42.5414$
$d_5 = 9.3616$    $n_3 = 1.72000$    $\nu_3 = 41.98$
$r_6 = -1096.6423$
$d_6 = 6.9452$
$r_7 = 95.5924$
$d_7 = 1.4439$    $n_4 = 1.59270$    $\nu_4 = 35.29$
$r_{7'} = \infty$
$d_{7'} = 12.5573$
$r_{8'} = \infty$
$d_{8'} = 1.4439$    $n_{4'} = 1.59270$    $\nu_{4'} = 35.29$
$r_8 = -51.5733$
$d_8 = 6.3414$
$r_9 = -29.3375$
$d_9 = 3.4448$    $n_5 = 1.62606$    $\nu_5 = 39.21$
$r_{10} = -177.0669$ When aberration curves (FIG. 16) of the lens system having the above-mentioned numerical data are compared with aberration curves of Embodiment 1 (FIG. 2), it is evident that aberrations, especially astigmatism and distortion, of the former lens system are aggravated. This clearly shows the effectiveness of the present invention, especially the effect attained by the use of the thick lens.

The lens system according to the present invention is arranged to be focused on an object at a short distance by simultaneously moving the first lens, which is a positive meniscus lens having a surface concentric with the stop, and the fifth lens which is a negative meniscus lens having a surface concentric with the stop. In other words, this focusing method is a combination of the focusing methods (3) and (5) mentioned before. When the first lens is moved, spherical aberration becomes negative and curvature of field becomes positive. On the other hand, when the fifth lens is moved, spherical aberration becomes negative and curvature of field also becomes negative. Therefore, by adequately selecting the amounts of movements of the first lens and fifth lens, it is possible to make the amount of variation of the optical image position determined by spherical aberration approximately equal to that determined by curvature of field.

Figure 17:
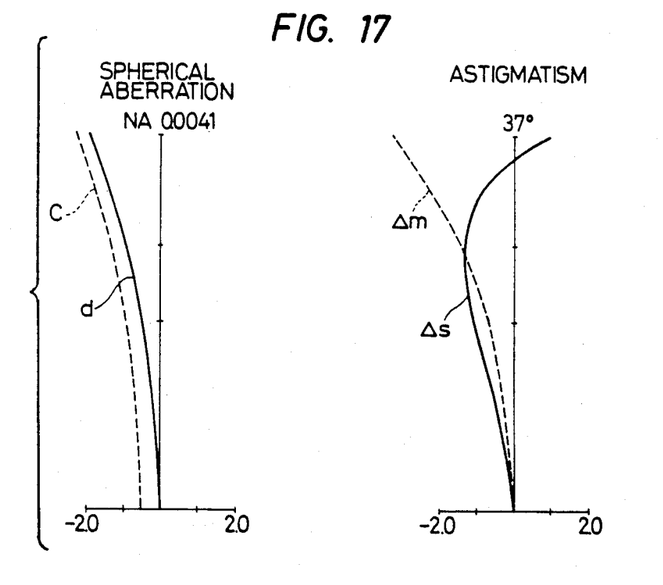
FIG. 17 shows graphs illustrating aberration curves obtained when the lens system according to Embodiment 13 is focused on an object at a short distance by moving the first and fifth lenses.

For example, when the lens system according to Embodiment 13 is focused on an object at a short distance with the magnification 1/33 by moving the first and fifth lenses, values of airspaces $d_2$ and $d_8$ become as follows.

$$d_2 = 5.36, d_8 = 5.94$$

At that time, aberration curves of said lens system become as shown in FIG. 17.

Figure 18:
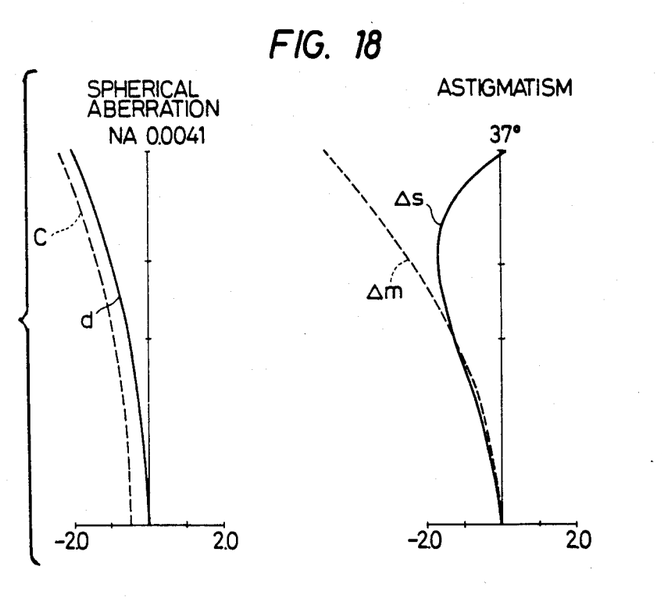
FIG. 18 shows graphs illustrating aberration curves obtained when the lens system according to Embodiment 13 is focused by moving the fifth lens.

When the above-mentioned lens system according to Embodiment 13 is focused on an object at the short distance by moving the rear lens only, the airspace $d_8$ becomes $d_8 = 6.30$. Aberration curves in that case are shown in FIG. 18. At that time, both of spherical aberration and curvature of field vary in the same direction compared with the state that the same lens system is focused on an object at the infinite distance. However, the amount of variation of curvature of field is larger compared with the amount of variation of spherical aberration.

Figure 19:
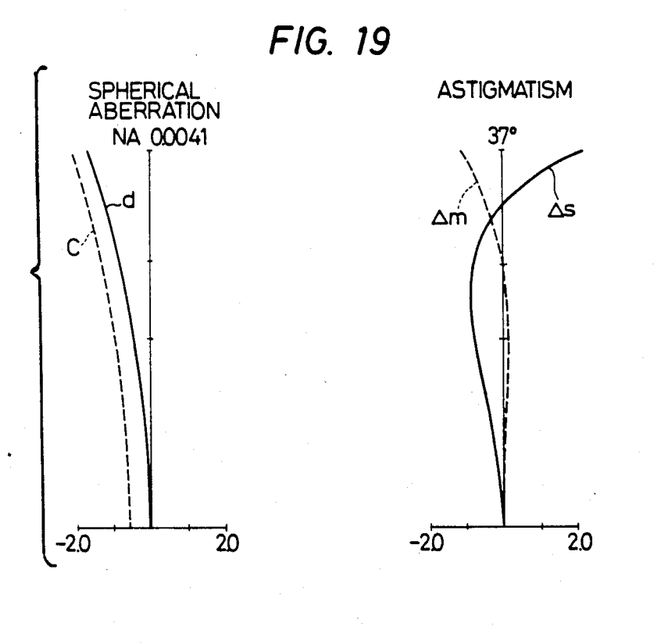
FIG. 19 shows graphs illustrating aberration curves obtained when the lens system according to Embodiment 13 is focused by moving the first lens.

On the other hand, when said lens system is focused by advancing the front lens only, the airspace $d_2$ becomes $d_2 = 6.34$. Aberration curves at that time are shown in FIG. 19. As shown in this figure, spherical aberration varies in the direction opposite to the direction of variation of curvature of field.

As described in the above, the optical image position determined by curvature of field is deviated from the optical image position determined by spherical aberration in both cases.

In compact cameras, the stop is fixed in most cases. Therefore, when the afore-mentioned focusing method to move the first and fifth lenses are adopted, the lens moving mechanism should be provided extending over to both sides of the stop mechanism and, consequently, the lens moving mechanism becomes complicated. In case that the focusing method to advance the front lens or front lens group is adopted, the lens moving mechanism becomes simple when the focusing mechanism is provided in the front portion of the camera. Besides, when the focusing method to move the fourth lens, i.e., the intermediate lens, or the focusing method to move the fifth lens, i.e., the rear lens group, is adopted and the focusing mechanism is provided in rear of the srop, the lens moving mechanism becomes simple and this is preferable especially in case of an automatic focusing type camera.

I claim:

1. A photographic lens system comprising a front lens group and a rear lens group, said front lens group comprising a first, second and third lenses, said first lens being a positive meniscus lens arranged to be convex toward the object side, said second lens being a biconcave lens, said third lens being a positive lens, said rear lens group comprising a fourth and fifth lens, said fourth lens being a biconvex lens, said fifth lens being a negative meniscus lens arranged to be convex toward the image side, said photographic lens system being arranged to fulfill the condition (1) shown below:

$$0.15f < d_7 < 0.4f \tag{1}$$

where, reference symbol $d_7$ represents the thickness of the fourth lens, and reference symbol f represents the focal length of the lens system as a whole.

2. A photographic lens system according to claim 1 further fulfilling the conditions (2) and (3) shown below:

$$1.7 < n_2 \tag{2}$$

$$0.35f < |f_5| < 0.6f, f_5 < 0 \tag{3}$$

where, reference symbol $n_2$ represents the refractive index of the second lens, and reference symbol $f_5$ represents the focal length of the fifth lens.

3. A photographic lens system according to claim 2 further fulfilling the condition (4) shown below:

$$0.25f < |r_9| < 0.35f \tag{4}$$

where, reference symbol $r_9$ represents the radius of curvature of the surface on the object side of the fifth lens.

4. A photographic lens system according to claim 3 further fulfilling the condition (5) shown below:

$$0.4f < |r_8| < 0.5f \tag{5}$$

where, reference symbol $r_8$ represents the radius of curvature of the surface on the image side of the fourth lens.

5. A photographic lens system according to claim 1 further comprising a stop arranged between said front lens group and said rear lens group wherein at least one lens constituting said front lens group is arranged as a first movable lens component and at least one lens constituting said rear lens group is arranged as a second moveble lens component, said first movable lens component having refractive power with a sign different from the sign of refractive power of said second movable lens component, said photographic lens system being arranged to be focused by moving said first and second movable lens components.

6. A photographic lens system according to claim 5 wherein said first movable lens component has positive refractive power.

7. A photographic lens system according to claim 5 wherein said photographic lens system is arranged to be focused by moving said first lens and said fifth lens.

8. A photographic lens system according to claim 1 wherein said photographic lens system has the following numerical data:

$r_1 = 36.9278$
$d_1 = 10.6219$    $n_1 = 1.88300$    $\nu_1 = 40.76$
$r_2 = 71.8243$
$d_2 = 4.9584$
$r_3 = -251.7459$
$d_3 = 3.4445$    $n_2 = 1.80518$    $\nu_2 = 25.43$
$r_4 = 35.6209$
$d_4 = 2.5517$
$r_5 = 42.5414$
$d_5 = 9.3616$    $n_3 = 1.72000$    $\nu_3 = 41.98$
$r_6 = -1096.6423$
$d_6 = 6.9452$
$r_7 = 95.5924$
$d_7 = 22.8878$    $n_4 = 1.59270$    $\nu_4 = 35.29$
$r_8 = -51.5733$
$d_8 = 6.3414$
$r_9 = -29.3375$
$d_9 = 3.4448$    $n_5 = 1.62606$    $\nu_5 = 39.21$
$r_{10} = -177.0669$
$f = 100$, $|f_5|/f = 0.557$, $f_{123}/f_4 = 2.35$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $v_1$ through $v_5$ respectively represent Abbe's numbers of respective lenses.

9. A photographic lens system according to claim 1 wherein said photographic lens system has the following numerical data:

$r_1 = 37.2084$
$d_1 = 10.6181$    $n_1 = 1.88300$    $v_1 = 40.76$
$r_2 = 69.9787$
$d_2 = 4.9511$
$r_3 = -221.5758$
$d_3 = 3.4433$    $n_2 = 1.76182$    $v_2 = 26.55$
$r_4 = 35.9272$
$d_4 = 2.5508$
$r_5 = 42.3315$
$d_5 = 9.3582$    $n_3 = 1.71700$    $v_3 = 47.94$
$r_6 = -2207.6200$
$d_6 = 6.9057$
$r_7 = 92.4645$
$d_7 = 23.1448$    $n_4 = 1.59270$    $v_4 = 35.29$
$r_8 = -51.0854$
$d_8 = 5.9603$
$r_9 = -29.4121$
$d_9 = 3.6096$    $n_5 = 1.66998$    $v_5 = 39.32$
$r_{10} = -154.9387$
$f = 100, |f_5|/f = 0.548, f_{123}/f_4 = 2.34$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refracitve indices of respective lenses, and reference symbols $v_1$ through $v_5$ respectively represent Abbe's numbers of respective lenses.

10. A photographic lens system according to claim 1 wherein said photographic lens system has the following numerical data:

$r_1 = 37.7611$
$d_1 = 11.6679$    $n_1 = 1.88300$    $v_1 = 40.76$
$r_2 = 73.0205$
$d_2 = 4.6672$
$r_3 = -244.9971$
$d_3 = 3.4483$    $n_2 = 1.80518$    $v_2 = 25.43$
$r_4 = 37.4424$
$d_4 = 2.5545$
$r_5 = 44.3299$
$d_5 = 9.3717$    $n_3 = 1.72000$    $v_3 = 41.98$
$r_6 = -656.8615$
$d_6 = 7.6324$
$r_7 = 99.1495$
$d_7 = 20.3054$    $n_4 = 1.59739$    $v_4 = 34.48$
$r_8 = -46.7657$
$d_8 = 5.4097$
$r_9 = -29.4558$
$d_9 = 7.5910$    $n_5 = 1.62831$    $v_5 = 37.95$
$r_{10} = -282.7250$
$f = 100, |f_5|/f = 0.529, f_{123}/f_4 = 2.39$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refracitve indices of respective lenses, and reference symbols $v_1$ through $v_5$ respectively represent Abbe's numbers of respective lenses.

11. A photographic lens system according to claim 1 wherein said photographic lens system has the following numerical data:

$r_1 = 37.1666$
$d_1 = 11.6679$    $n_1 = 1.88300$    $v_1 = 40.76$
$r_2 = 70.7724$
$d_2 = 4.6672$
$r_3 = -314.4423$
$d_3 = 3.4483$    $n_2 = 1.80518$    $v_2 = 25.43$
$r_4 = 36.3377$
$d_4 = 2.5545$
$r_5 = 43.7507$
$d_5 = 9.3717$    $n_3 = 1.72000$    $v_3 = 41.98$
$r_6 = -732.0967$
$d_6 = 7.6324$
$r_7 = 101.5236$
$d_7 = 22.7588$    $n_4 = 1.59270$    $v_4 = 35.29$
$r_8 = -51.8227$
$d_8 = 5.4097$
$r_9 = -30.4738$
$d_9 = 6.8967$    $n_5 = 1.62606$    $v_5 = 39.21$
$r_{10} = -225.3586$
$f = 100, |f_5|/f = 0.571, f_{123}/f_4 = 2.12$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refracitve indices of respective lenses, and reference symbols $v_1$ through $v_5$ respectively represent Abbe's numbers of respective lenses.

12. A photographic lens system according to claim 1 wherein said photographic lens system has the following numerical data:

$r_1 = 38.0501$
$d_1 = 11.6679$    $n_1 = 1.88300$    $v_1 = 40.76$
$r_2 = 70.2468$
$d_2 = 4.6672$
$r_3 = -215.0498$
$d_3 = 3.4483$    $n_2 = 1.80518$    $v_2 = 25.43$
$r_4 = 41.1290$
$d_4 = 2.5545$
$r_5 = 44.6558$
$d_5 = 9.3717$    $n_3 = 1.72000$    $v_3 = 43.70$
$r_6 = -1355.6606$
$d_6 = 5.8781$
$r_7 = 92.5723$
$d_7 = 22.5159$    $n_4 = 1.59270$    $v_4 = 35.29$
$r_8 = -50.0412$
$d_8 = 5.4097$
$r_9 = -28.1250$
$d_9 = 6.9005$    $n_5 = 1.62606$    $v_5 = 39.21$
$r_{10} = -172.7446$
$f = 100, |f_5|/f = 0.547, f_{123}/f_4 = 2.32$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $v_1$ through $v_5$ respectively represent Abbe's numbers of respective lenses.

13. A photographic lens system according to claim 1 wherein said photographic lens system has the following numerical data:

```
r₁ = 37.5812
d₁ = 11.6238      n₁ = 1.88300     ν₁ = 40.76
r₂ = 72.9450
d₂ = 4.6496
r₃ = −228.4699
d₃ = 3.4352       n₂ = 1.80518     ν₂ = 25.43
r₄ = 36.4531
d₄ = 2.5448
r₅ = 42.1673
d₅ = 9.3363       n₃ = 1.72000     ν₃ = 41.98
r₆ = −816.9711
d₆ = 7.6036
r₇ = 96.4188
d₇ = 20.2247      n₄ = 1.63980     ν₄ = 34.48
r₈ = −47.0295
d₈ = 5.3892
r₉ = −29.4885
d₉ = 7.5593       n₅ = 1.72342     ν₅ = 37.95
r₁₀ = −215.6929
f = 100, |f₅|/f = 0.480, f₁₂₃/f₄ = 2.58
``` where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

14. A photographic lens system according to claim 1 wherein said photographic lens system has the following numerical data:

```
r₁ = 37.2670
d₁ = 10.6334      n₁ = 1.84100     ν₁ = 43.23
r₂ = 71.1567
d₂ = 4.9483
r₃ = −211.9667
d₃ = 3.4483       n₂ = 1.71736     ν₂ = 29.51
r₄ = 35.1359
d₄ = 2.5545
r₅ = 42.5678
d₅ = 9.3717       n₃ = 1.71700     ν₃ = 47.94
r₆ = −5122.0812
d₆ = 6.9156
r₇ = 103.8046
d₇ = 23.1784      n₄ = 1.59880     ν₄ = 40.00
r₈ = −49.0515
d₈ = 5.9690
r₉ = −29.9591
d₉ = 3.6149       n₅ = 1.66390     ν₅ = 39.32
r₁₀ = −152.3278
f = 100, |f₅|/f = 0.568, f₁₂₃/f₄ = 2.37
``` where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

15. A photofraphic lens system according to claim 1 wherein said photographic lens system has the following numerical data:

```
r₁ = 34.8858
d₁ = 11.6672      n₁ = 1.86995     ν₁ = 40.69
r₂ = 69.5101
d₂ = 4.6669
r₃ = −382.0239
d₃ = 2.9028       n₂ = 1.85563     ν₂ = 23.66
r₄ = 29.4132
d₄ = 2.5545
r₅ = 33.1008
d₅ = 9.9161       n₃ = 1.72047     ν₃ = 34.72
r₆ = 1433.9817
d₆ = 7.8050
r₇ = 80.0037
d₇ = 19.3608      n₄ = 1.66446     ν₄ = 35.71
r₈ = −43.0020
d₈ = 4.7013
r₉ = −27.2916
d₉ = 6.0628       n₅ = 1.83400     ν₅ = 37.16
r₁₀ = −160.8388
f = 100, |f₅|/f = 0.402, f₁₂₃/f₄ = 3.03
``` where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

16. A photographic lens system according to claim 1 wherein said photographic lens system has the following numerical data:

```
r₁ = 35.7111
d₁ = 11.7178      n₁ = 1.87588     ν₁ = 43.49
r₂ = 71.7423
d₂ = 4.6871
r₃ = −380.6859
d₃ = 2.9154       n₂ = 1.82506     ν₂ = 24.96
r₄ = 29.4108
d₄ = 2.5655
r₅ = 33.6628
d₅ = 9.9591       n₃ = 1.72047     ν₃ = 34.72
r₆ = 624.1191
d₆ = 7.839
r₇ = 80.3506
d₇ = 19.4396      n₄ = 1.66446     ν₄ = 35.71
r₈ = −43.1884
d₈ = 4.7217
r₉ = −27.6775
d₉ = 6.0858       n₅ = 1.83400     ν₅ = 37.16
r₁₀ = −156.5912
f = 100, |f₅|/f = 0.412, f₁₂₃/f₄ = 3.13
``` where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

17. A photographic lens system according to claim 1 wherein said photographic lens system has the following numerical data:

```
r₁ = 34.9347
d₁ = 11.6667      n₁ = 1.88300     ν₁ = 40.76
r₂ = 67.6624
d₂ = 4.6667
r₃ = −420.7331
d₃ = 2.9026       n₂ = 1.84666     ν₂ = 23.88
r₄ = 29.4509
d₄ = 2.5543
r₅ = 33.5803
d₅ = 9.9157       n₃ = 1.72047     ν₃ = 34.72
r₆ = 840.1923
d₆ = 7.8048
r₇ = 80.0000
d₇ = 19.3540      n₄ = 1.66446     ν₄ = 35.71
```

-continued

```
r8 = -43.0000
d8 = 4.7015
r9 = -27.8644
d9 = 6.0581        n5 = 1.83400    ν5 = 37.16
r10 = -164.9675
f = 100, |f5|/f = 0.410, f123/f4 = 3.16
``` where, reference symbols $r_1$ through $r_{10}$ respectively represent radii of curvature of respective lens surfaces, reference symbols $d_1$ through $d_9$ respectively represent thicknesses of respective lenses and arispaces between respective lenses, reference symbols $n_1$ through $n_5$ respectively represent refractive indices of respective lenses, and reference symbols $\nu_1$ through $\nu_5$ respectively represent Abbe's numbers of respective lenses.

18. A photographic lens system according to claim 1 wherein said photographic lens system has the following numerical data:

```
r1 = 37.2931
d1 = 11.6694       n1 = 1.88300    ν1 = 40.76
r2 = 73.4932
d2 = 4.8627
r3 = -161.2470
d3 = 3.4488        n2 = 1.84666    ν2 = 23.88
r4 = 36.8066
d4 = 2.5549
r5 = 42.2447
d5 = 9.3730        n3 = 1.72047    ν3 = 34.72
r6 = -216.8284
d6 = 7.6333
r7 = 88.4469
d7 = 20.3040       n4 = 1.66446    ν4 = 35.71
r8 = -47.4593
d8 = 5.3801
r9 = -29.5908
d9 = 7.5891        n5 = 1.83400    ν5 = 37.16
r10 = -193.4414
f = 100, |f5|/f = 0.422, f123/f4 = 2.66
``` where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

19. A photographic lens system according to claim 1 wherein said photographic lens system has the following numerical data:

```
r1 = 34.5897
d1 = 11.6678       n1 = 1.88300    ν1 = 40.76
r2 = 68.2036
d2 = 4.6671
r3 = -469.2025
d3 = 2.9029        n2 = 1.84666    ν2 = 23.88
r4 = 30.4475
d4 = 2.5546
r5 = 36.6517
d5 = 9.9167        n3 = 1.72047    ν3 = 34.72
r6 = 1481.2730
d6 = 7.842
r7 = 86.3452
d7 = 19.2011       n4 = 1.66446    ν4 = 35.71
r8 = -45.2419
d8 = 5.0184
r9 = -29.6013
d9 = 6.1629        n5 = 1.83400    ν5 = 37.16
r10 = -167.4479
f = 100, |f5|/f = 0.440, f123/f4 = 2.96
``` where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

20. A photographic lens system according to claim 1 wherein said photographic lens system has the following numerical data:

```
r1 = 37.0605
d1 = 11.6678       n1 = 1.88300    ν1 = 40.76
r2 = 71.5043
d2 = 4.6672
r3 = -170.9580
d3 = 3.4483        n2 = 1.84666    ν2 = 23.88
r4 = 36.9683
d4 = 2.5546
r5 = 42.4542
d5 = 9.3717        n3 = 1.72047    ν3 = 34.72
r6 = -232.2169
d6 = 7.6232
r7 = 89.3367
d7 = 20.3012       n4 = 1.66446    ν4 = 35.71
r8 = -46.6954
d8 = 5.4097
r9 = -29.6999
d9 = 7.5880        n5 = 1.83400    ν5 = 37.16
r10 = -199.0312
f = 100, |f5|/f = 0.427, f123/f4 = 2.70
``` where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refracitve indices of respective lenses, and reference symbols $\nu_1$ through $\nu_5$ respectively represent Abbe's numbers of respective lenses.

21. A photographic lens system according to claim 6 wherein said photographic lens system is arranged to be focused by moving said first lens and said fifth lens.

* * * * *